(12) United States Patent
Falkowski

(10) Patent No.: US 6,578,702 B2
(45) Date of Patent: Jun. 17, 2003

(54) REMOTELY ADJUSTABLE RAILING SUPPORT POSTS FOR CONVEYOR LINES AND METHOD OF OPERATION THEREOF

(75) Inventor: Witold W. Falkowski, Kitchener (CA)

(73) Assignee: Joseph E. Seagram & Sons, Ltd., Waterloo (CA)

( * ) Notice: Subject to any disclaimer, the term of this patent is extended or adjusted under 35 U.S.C. 154(b) by 0 days.

(21) Appl. No.: 09/985,994

(22) Filed: Nov. 7, 2001

(65) Prior Publication Data

US 2003/0085104 A1 May 8, 2003

(51) Int. Cl.[7] .................. B65G 43/10; B65G 15/00; B65G 17/00; B65G 21/20; B65G 39/18
(52) U.S. Cl. .................. 198/575; 198/836.1; 198/836.3
(58) Field of Search .................. 198/836.1, 836.3, 198/575

(56) References Cited

U.S. PATENT DOCUMENTS

| | | | | |
|---|---|---|---|---|
| 5,246,314 A | * | 9/1993 | Smith et al. .................. 406/86 |
| 5,542,789 A | * | 8/1996 | Aidlin et al. .................. 406/88 |
| 6,050,396 A | * | 4/2000 | Moore .................. 198/836.3 |
| 6,244,429 B1 | * | 6/2001 | Drewitz et al. .................. 198/836.3 |
| 6,305,528 B1 | * | 10/2001 | Leonard .................. 198/836.3 |

* cited by examiner

Primary Examiner—Christopher P. Ellis
Assistant Examiner—Gene O. Crawford
(74) Attorney, Agent, or Firm—Daryl W. Schnurr

(57) ABSTRACT

An adjustable railing support system has a conveyor and a railing extending along each side of the conveyor. The conveyor is used to transport containers of various sizes and shapes in different runs. For each size and shape of container, the support posts must be adjusted and the actuators are connected to a programmable logic controller that is operable and connected to sequentially adjust the support posts relative to the conveyor until all of the support posts have been adjusted as required to transport container of one particular size and shape. The controller has a memory so that the precise location of the support posts for a particular product line can be stored. When switching from one known product line to another, the adjustments can be made automatically from the memory of the controller.

10 Claims, 5 Drawing Sheets

US 6,578,702 B2

REMOTELY ADJUSTABLE RAILING SUPPORT POSTS FOR CONVEYOR LINES AND METHOD OF OPERATION THEREOF

BACKGROUND OF THE INVENTION

1. Field of the Invention

This invention relates to an adjustable railing support post system for conveyors and to a method of operation thereof More particularly, this invention relates to a railing support post system where there are plurality of support posts supporting a railing and the support posts can be sequentially adjusted by a controller to adjust the position of the railing relative to the conveyor.

2. Description of the Prior Art

Previously, support posts that support a railing of a conveyor have been adjusted manually. One such apparatus involving manual adjustment is described in U.S. Pat. No. 5,492,218. Manually adjustable systems suffer from a disadvantage in that the systems require a great deal of time to complete an adjustment and the adjustments are sometimes inaccurate. Also, when the system has to be completely re-adjusted because of a new bottle, or other product, that is to be conveyed, the system must be shut down for a long period of time relative to the system of the present invention.

SUMMARY OF THE INVENTION

It is an object of the present invention to provide an adjustable railing support post system for conveyors where the support posts are automatically adjustable by activating a controller. Preferably, the controller has a memory and the support posts can be returned to a previous position at the push of a button. It is a further object of the present invention to provide an adjustable railing support post system and method of adjustment thereof where the system has low power requirements and the support posts are adjusted sequentially.

An adjustable railing support post system for conveyors has a conveyor and a railing for the conveyor. The conveyor is used to transport several types of containers of various sizes and shapes. The railing is supported by a plurality of support posts and the support posts are supported by a plurality of actuators. There is one actuator for each support post. Each actuator is connected to a controller and the controller is operable and connected to sequentially adjust the support posts relative to the conveyor until all of the support posts have then been adjusted as required to transport containers of one particular size and shape.

A method of adjusting a railing support post system for a conveyor is used with a conveyor having at least one railing supported by a plurality of support posts. Support posts are supported by-a plurality of actuators, there being one actuator for each support post. Each actuator is connected to a controller. The method comprises operating the controller to sequentially adjust the location of each support post, thereby adjusting the location of the railing.

DESCRIPTION OF A PREFERRED EMBODIMENT

Figure 1:
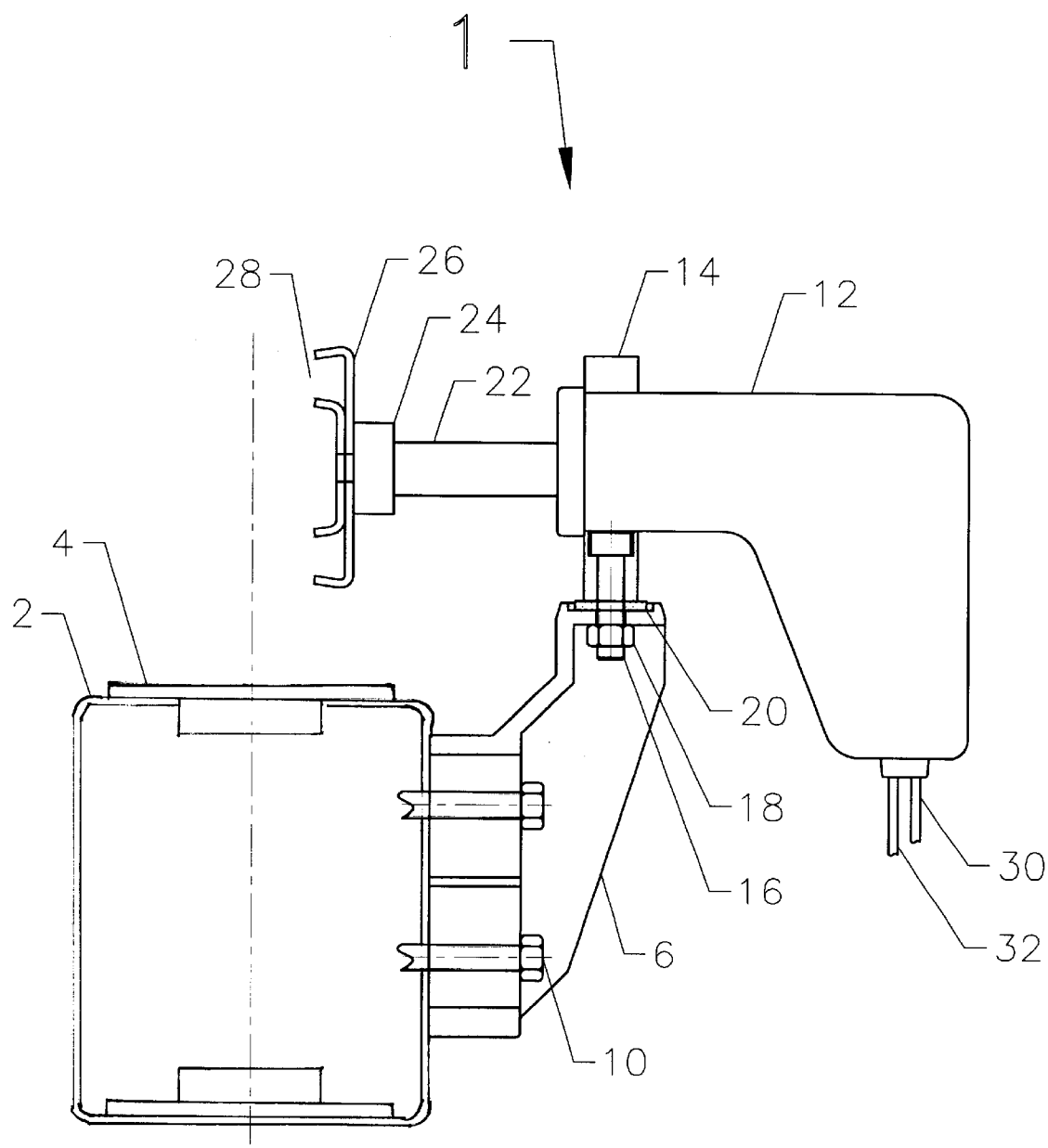
In FIG. 1, there is shown a side view of a support post and actuator mounted on a conveyor line with a support post being in an extended position.

In FIG. 1, an adjustable railing support post system 1 has a conveyor 2 and a movable table top chain 4. A bracket 6 is bolted to a side 8 of the conveyor 1 by bolts 10. The bracket 6 supports a motorized actuator 12, the actuator 12 being connected to the bracket 6 by a clamp 14. The clamp 14 is connected to the bracket 6 by a bolt 16 and nut 18. A spacer 20 separates the actuator clamp 14 from the bracket 6. A support post 22 extends from the actuator 12. The support post 22 has a locking collar 24 that supports a rail clamp 26. The rail clamp 26, in turn, supports a railing 28. The actuator has an input line, being a power cable 30, and an output line, being a feedback cable 32, extending therefrom. It can be seen that in FIG. 1 the support post 22 is in an extended position.

Figure 2:
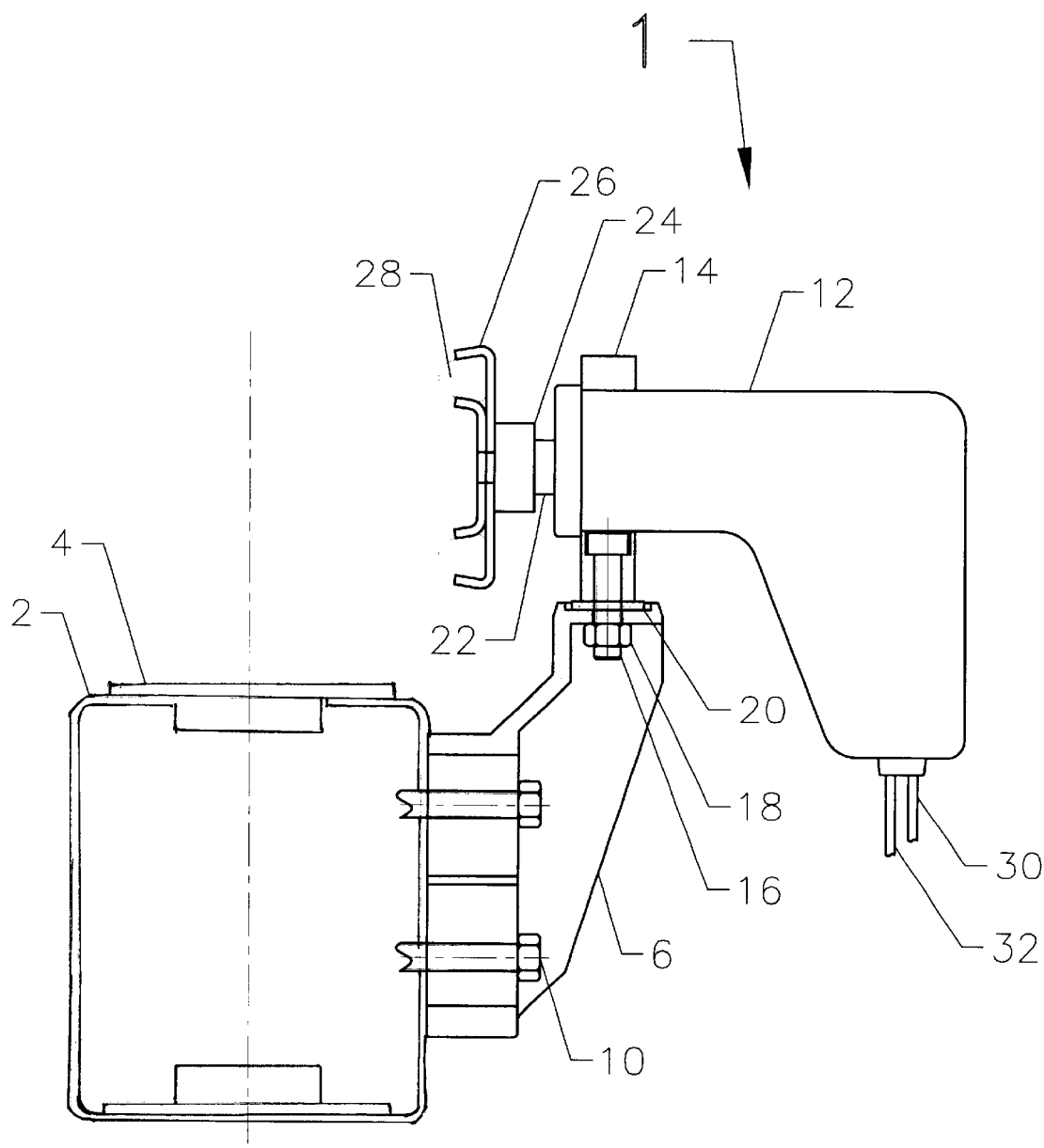
In FIG. 2, there is shown a side view of one support post and actuator of FIG. 1 with the support post being in a retracted position.

FIG. 2 is identical to FIG. 1 except that the support post 22 is in a retracted position with respect to the actuator 12. The same reference numerals are used in FIG. 2 to describe those components that are identical to the components of FIG. 1 without further description. Each actuator is preferably controlled to adjust the support post for that actuator in small increments.

Figure 3:
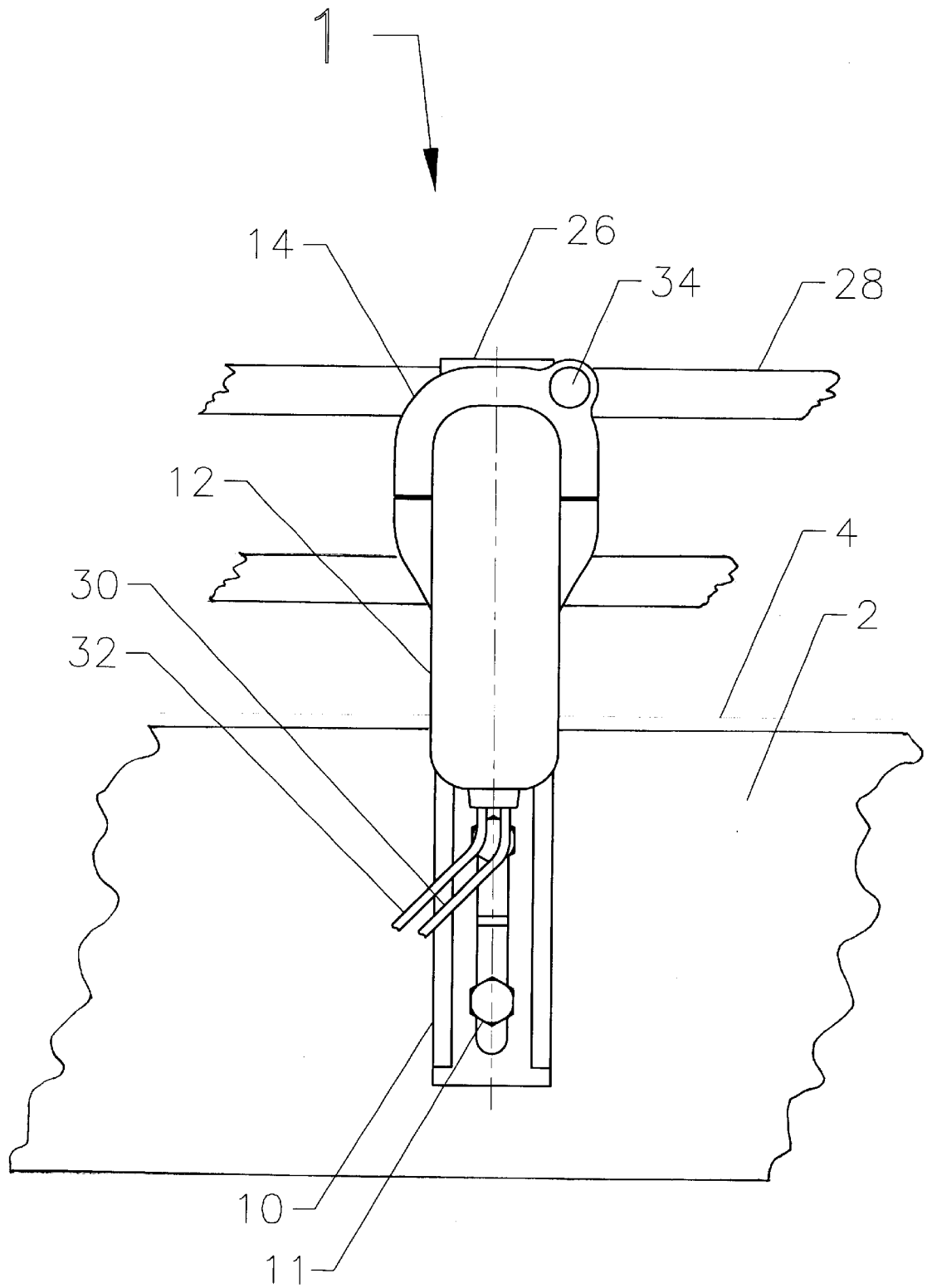
In FIG. 3, there is shown an end view of the actuator of FIG. 1.

In FIG. 3, there is shown an end view of the actuator 12 mounted on a conveyor 2. The same reference numerals are used in FIG. 3 to describe those components that are identical to the components of FIG. 1 without further description. An identification symbol 34 is located on the actuator clamp 14 so that the particular support posts can be identified. In practising the present inventions, it will often be necessary to refer to a particular support post location by referring to the identification symbol for that location. Each location will have a different identification symbol.

Figure 4:
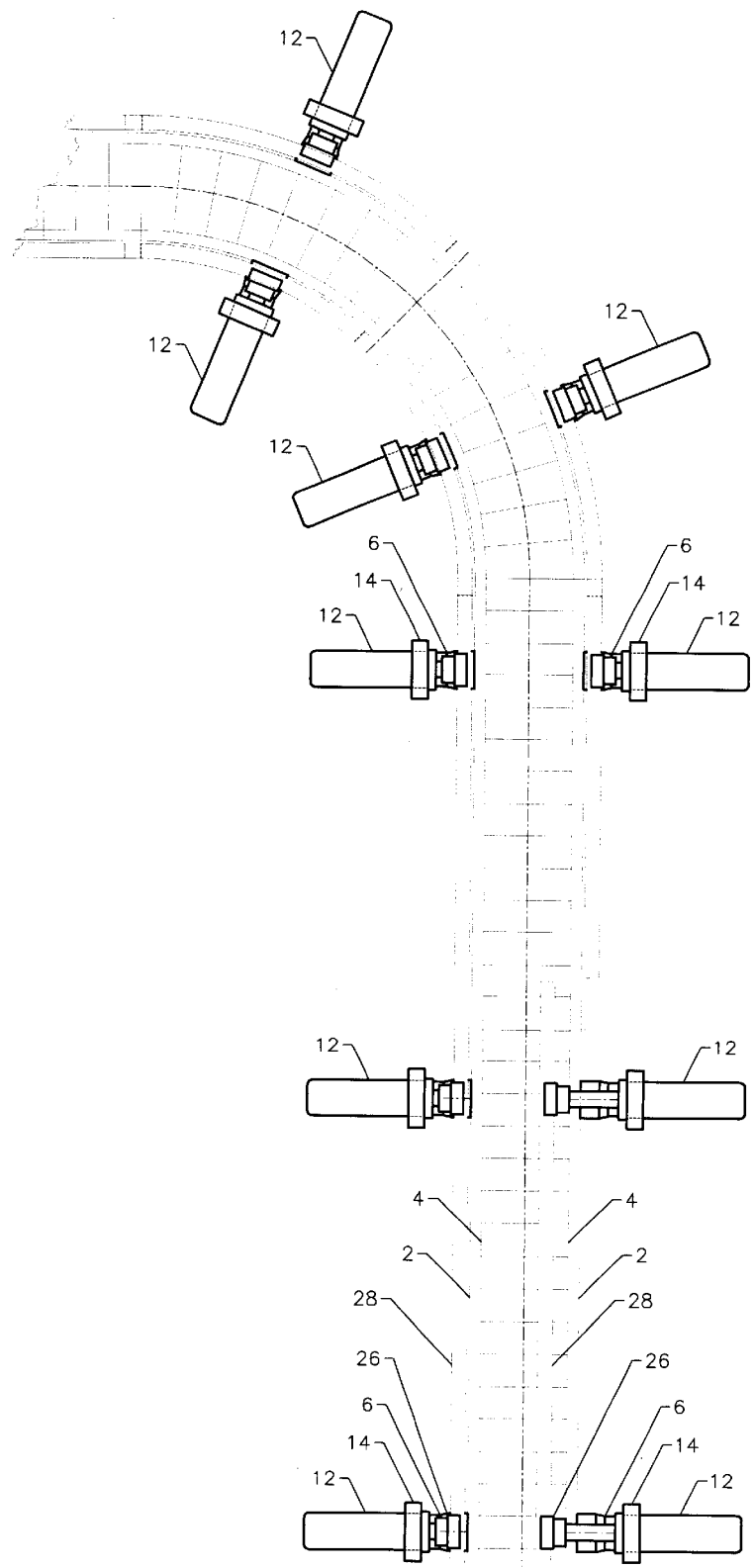
In FIG. 4, there is shown a schematic top view of a conveyor line with support posts supporting a railing; and In FIG. 5, there is shown a schematic block diagram of the connection of the actuators to the controller.

In FIG. 4, there is shown a partial top view of the conveyor 2. It can be seen that the railing 28 is a first railing on one side of the conveyor 2 and a second railing 36 is located on a side of the conveyor 2 opposite to the first railing 28. Each railing 28, 36 is supported by a plurality of support posts 22. The support posts are supported by a plurality of motorized actuators 12 with each support post having one actuator. The wiring of the actuators has been omitted from FIG. 4 for ease of illustration. The same reference numerals are used in FIG. 4 as those used in FIGS. 1 to 3 for two components that are identical.

Figure 5:
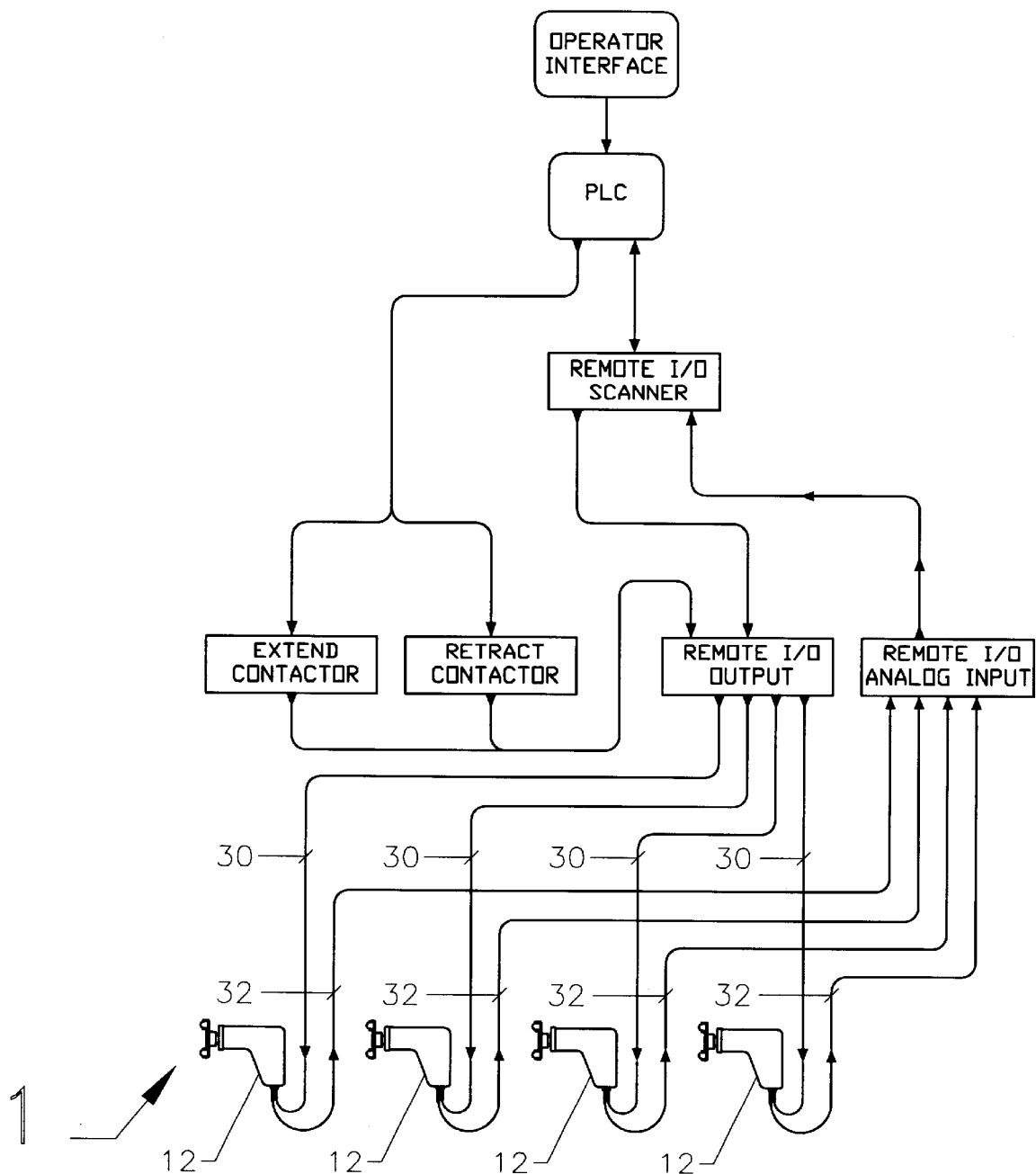

In FIG. 5, there is shown a schematic circuit diagram for four actuators 12. Additional actuators would be connected in the same manner. It can be seen that the power cable 30 for each actuator is connected to a remote I/O output and a power feedback cable 32 for each actuator is connected to a remote I/O analog input. In other words, the actuators are connected in parallel. The remote I/O analog input has an outlet connected to the inlet of a remote I/O scanner. The remote I/O scanner is in turn connected to a programmable logic controller. The programmable logic controller is connected to an extend contactor and to a retract contactor. The outputs from the contactors are connected to the input of the remote I/O output. The remote I/O scanner has an output connected to the input of the remote I/O output. The programmable logic controller has an operator interface connected thereto or located thereon.

In operation, the programmable logic controller is activated by the operator interface to adjust each of the four actuators sequentially by either extending or retracting the support post for each of the actuators. Preferably, the support posts are each adjusted sequentially in small increments. When the support posts are extended or retracted, the railing will be positioned either closer to or further from the conveyor. Since the actuators are adjusted sequentially, the electronic circuitry can be operated at a very low power level. It is therefore much less expensive to assemble and to operate the system of the present invention compared to a system that adjusts all support posts simultaneously and operates at a high power level. The programmable logic controller has a memory and the operator interface has sufficient switches to access information stored in memory. For a particular size and shape of container that is to be transported on the conveyor, each of the support posts are adjusted sequentially and the adjustment information is stored in the memory. This procedure is repeated for each size and shape of container that is to be transported. Then, when a product line is changed, the conveyor system can be quickly and accurately changed to conform with the size and shape of the container that is to be transported on the conveyor simply by incorporating the previous settings from the memory of the programmable logic controller. Thus, whenever a changeover is being made to a different product line that has been preset and is stored in memory, the changeover can be accomplished with the push of a button. When a container of a new size and shape is to be transported on the conveyor, usually each of the support posts will have to be adjusted sequentially to the desired position through the controller. However, once all of the support posts have been properly adjusted for that new container, the adjustments can then be stored in memory and utilized whenever the product line for that container is desired to be transported. A further advantage of the system of the present invention is that, sometimes, it will be desirable to readjust one or two of the support posts to cause a particular container to be conveyed in the most efficient manner. This adjustment can also be carried out remotely through the controller and the new location of the support posts can be stored in memory. Also, on some occasions when shifting to a container of a different size and shape than the preceding container, it will not be necessary to adjust all of the support posts. When this occurs, adjustments can be made even more quickly.

While the containers can be of various sizes and shapes within a particular range that will fit within the adjustment limits of the conveyor and the railings, the containers can have various sizes and shapes. For example, the containers could have a square or rectangular cross section. Preferably, the containers will be bottles and still more preferably, the containers will have a circular cross section.

I claim:

1. An adjustable railing support post system for conveyors comprises a conveyor and a railing for said conveyor, said conveyor being used to transport several types of containers of various shapes and sizes, said railing being supported by a plurality of support posts, said support posts being supported by a plurality of actuators, there being one actuator for each support post, each actuator being connected to a controller, said controller being operable and connected to sequentially adjust the support posts relative to the conveyor until all of the support posts have been adjusted to transport containers of one particular shape and size, said controller having a memory to retain a position of each support post relative to the conveyor for each type of container to be transported, said memory being accessible to automatically return said support posts to a configuration to transport that type of container.

2. An adjustable railing support post system as claimed in claim 1 wherein the controller is a programmable logic controller.

3. An adjustable railing support post system as claimed in claim 2 wherein said railing is a first railing and there is a second railing extending along a side of said conveyor opposite to said first railing, said second railing being supported by a plurality of support posts, said support posts being supported by a plurality of actuators, there being one actuator for each support post, each actuator being connected to said controller.

4. An adjustable railing support post system as claimed in claim 2 wherein said programmable logic controller has one of a remote input/output and a networking card, each actuator having an input line and an output line, said actuators being connected in parallel to said one of said remote input/output and said networking card.

5. An adjustable railing support post system as claimed in any one of claims 1, 2 or 4 wherein said controller is connected to adjust the support post in each actuator in small increments.

6. An adjustable railing support post system as claimed in claim 4 wherein said actuators are connected in parallel to a remote I/O output and to a remote I/O analog input.

7. An adjustable railing support post system as claimed in claim 4 wherein each actuator has an input line and an output line, said input line being connected to a remote I/O output and said output line of each actuator being connected to a remote I/O analog input.

8. An adjustable railing support post system as claimed in any one of claims 6 or 7 wherein the remote I/O output is connected to a remote I/O scanner and in parallel to an extend contactor and a retract contactor, said remote I/O analog input being connected to said remote I/O scanner, said extend contactor and retract contactor, as well as said remote I/O scanner being connected to said programmable logic controller.

9. A method of adjusting a railing support post system for a conveyor, said conveyor having at least one railing supported by a plurality of support posts, said support posts being supported by a plurality of actuators, there being one actuator for each support post, each actuator being connected to a controller, said controller having a memory, said method comprising operating the controller to sequentially adjust the location of each support post, thereby adjusting the location of the railing, or using the controller to adjust the position of each of the support posts for several different product lines and storing the adjustments for each product line in memory, using the memory to automatically adjust the support posts whenever the product line is switched to a product line that has been stored in memory.

10. A method of adjusting a railing support post system as claimed in claim 9 including the steps of adjusting each support post sequentially in small increments.

* * * * *